Aug. 12, 1924.
H. SCHMIDT
AUTOMOBILE BUMPER
Filed Dec. 17, 1923
1,504,581
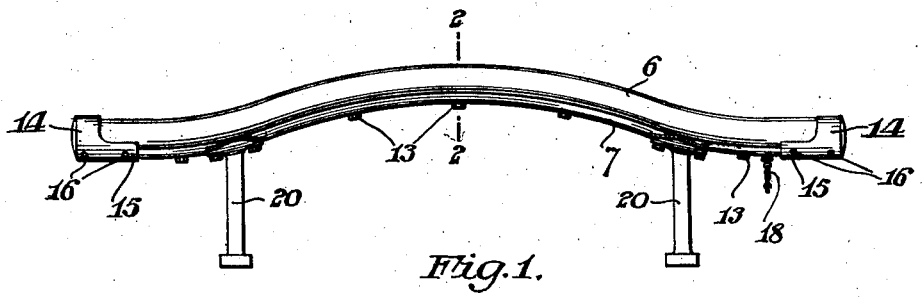
Fig. 1.
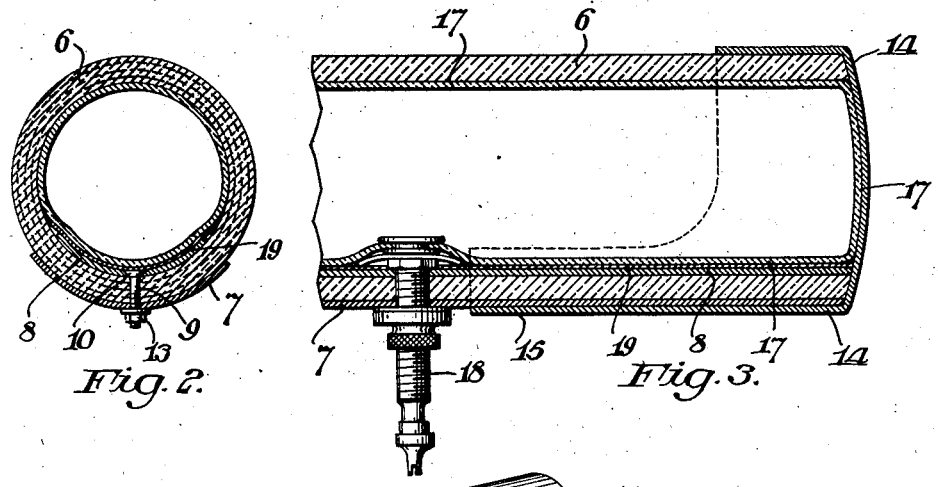
Fig. 2.   Fig. 3.
Fig. 4.
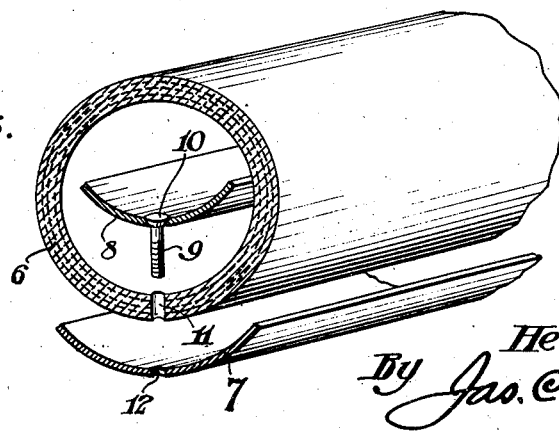
Fig. 5.
Inventor:
Henry Schmidt,
By Jas. C. Wobensmith
Attorney.

Patented Aug. 12, 1924.

1,504,581

UNITED STATES PATENT OFFICE.

HENRY SCHMIDT, OF PHILADELPHIA, PENNSYLVANIA, ASSIGNOR TO GEO. A. WEIDMAN CO., OF PHILADELPHIA, PENNSYLVANIA, A CORPORATION OF PENNSYLVANIA.

AUTOMOBILE BUMPER.

Application filed December 17, 1923. Serial No. 681,113.

*To all whom it may concern:*

Be it known that I, HENRY SCHMIDT, a citizen of the United States, residing at Philadelphia, in the county of Philadelphia and State of Pennsylvania, have invented certain new and useful Improvements in Automobile Bumpers, of which the following is a specification.

My invention relates to automobile bumpers (sometimes called fenders), and it has particular relation to an automobile bumper of the pneumatic type.

The principal object of my invention is to provide a simple and efficient automobile bumper of the pneumatic type, which will be relatively light, yet durable, which may be inexpensively constructed and conveniently assembled, and in which the means for maintaining the bumper inflated may be readily accessible for the purpose of replacement and repair.

The nature and characteristic features of my present invention will be more readily understood from the following description, taken in connection with the accompanying drawings forming part hereof, in which—

Figure 1 is a top or plan view of an automobile bumper embodying the main features of my present invention;

Fig. 2 is a transverse section thereof, enlarged, taken approximately on the line 2—2 of Fig. 1;

Fig. 3 is a longitudinal section of one end of the structure, also enlarged;

Fig. 4 is a perspective view of a cap member used at each end of the structure, the same being shown detached; and Fig. 5 is an enlarged fragmentary perspective view illustrating the manner of assembling certain of the component parts.

Referring to the drawings, in the particular embodiment of my invention therein shown, 6 is a resilient tubular member which may, if desired, be made of a suitable length of rubber hose of the desired diameter provided with the usual textile reinforcement embedded therein. Mounted on the exterior of the tubular member 6, on the side thereof toward the automobile upon which the structure is mounted, is a relatively rigid longitudinally extending bar 7, sector shaped in cross section, complemental to the external surface of the tubular member 6, and being suitably curved in its longitudinal extension in any preferred shape, such, for example, as that illustrated in Fig. 1 of the drawings. There is also provided a relatively rigid internal bar 8, also sector shaped in cross section, complemental to the internal surface of the tubular member 6, and being curved or shaped in its longitudinal extension complemental to the shape of the external sector bar 7. For the purpose of securing the sector bars 7 and 8 to the tubular member 6, and to each other, the internal sector bar 8 is provided at suitable locations along its length with a plurality of bolts 9, the heads 10 of which are preferably countersunk in the internal sector bar 8 so as thereby to provide a smooth internal surface. The bolts 9 are preferably brazed or otherwise fixedly secured to the internal sector bar 8, for a purpose to be presently explained. The bolts 9 extend through suitable apertures 11 in the tubular member 6, and also through suitable apertures 12 in the external sector bar 7, and are provided on their projecting threaded ends with nuts 13 for clamping the sector bars to the tubular member and to each other, as illustrated in Fig. 2 of the drawings. Each end of the tubular member 6 is provided with a closure device comprising an encompassing cap member 14, each of said cap members being provided with a shank or shoulder 15 (see Fig. 4) extending along the external sector bar 7. Bolts 16 serve to secure the cap members 14 to the ends of the structure, said bolts being threaded in suitable apertures in the respective end portions of the sector bar 7.

Mounted within the tubular member 6 is an inner tube 17, preferably made of soft flexible rubber, and having its ends closed to make the same air tight. The inner tube 17 is provided with an air valve 18, preferably of the type and size as are usually employed in connection with automobile tires. The air valve is preferably located near one end of the inner tube 17, and the sector bars 7 and 8 and the tubular member 6 are also complementally apertured to permit the air valve 18 to extend therethrough (see Fig. 3).

There is also preferably provided a longitudinally extending flap member 19, preferably made of tough textile material and interposed between the inner tube 17 and the internal sector bar 8 (see Figs. 2 and 3). For securing the bumper to the automobile, brackets 20 of any preferred type, such, for example, as are commonly used for attaching metallic bumpers to automobiles, may be employed.

It is desirable that as little metal as possible be employed on the front side of the bumper, and for this reason the cap members 14 in the front are made only of sufficient longitudinal extension to hold the ends of the external tubular member from being detached therefrom, and consequently, for the purpose of affording the requisite support against disarrangement, the shank or shoulder 15 is provided for each of the cap members on the rear portion thereof, which shoulders, as aforesaid, extend along and are secured to the external sector bar 7.

By the foregoing arrangement, there will be provided an automobile bumper which may be readily assembled, and in which the parts are conveniently accessible for the purpose of replacement and repair. By securing the bolts 9 to the internal sector bar 8, as hereinbefore described, considerable convenience in the initial assembly of the structure will be afforded, as it will be necessary only to push the internal sector bar through the resilient tubular member 6 to its proper position, thence passing the bolts through the apertures 11 of the tubular member, then placing the external sector bar 7 in position, and finally securing these parts to each other by applying the nuts 13 upon the projecting threaded ends of the bolts 9.

The inner tube 17 may be readily inserted in the external tubular member 6 through one end of the structure, it being understood that the cap member 14 at one end is left detached for this purpose, and, the air valve 18 being located adjacent the end of the inner tube 17, the same may be readily positioned by passing the same through suitable apertures which are provided in the sector bars 7 and 8 and the resilient tube 6. It should be understood that when the inner tube 17 is inflated to the requisite pressure, the cap members 14, which are secured to the ends of the structure in the manner hereinbefore set forth, will afford a sufficient support for the ends of the inner tube 17 to prevent the same from blowing out, and it should also be understood that, when the inner tube is thus inflated, the efficiency of the frictional engagement of the cap member 14 with the end of the external tube 6 will be proportional to the pressure within the inner tube 17, and the ends of the external tubular member will accordingly be securely held therein.

It will be seen that there is thus provided a simple, durable and efficient automobile bumper of the pneumatic type, which may be inexpensively constructed and readily and conveniently assembled, and in which the parts are conveniently accessible at all times for replacement and repair.

Having thus described the nature and characteristic features of my invention, what I claim as new and desire to secure by Letters Patent is:

1. A pneumatic bumper for automobiles comprising a resilient tubular member, a relatively rigid external bar sector shaped in cross section extending lengthwise with respect to said tubular member, means for securing said tubular member to said external bar, an internal resilient air tight tube, means for inflating said internal tube, and a cap member of rigid material mounted on each end of the structure and each provided with a shoulder portion overlapping the external bar and extending toward the center of the structure, said cap members being secured to the external bar and forming closures at the ends of the resilient tubular member first mentioned for the purpose of confining the internal resilient tube therein.

2. A pneumatic bumper for automobiles comprising a resilient tubular member, relatively rigid internal and external bars sector shaped in cross section extending lengthwise with respect to said tubular member and between which said tubular member is secured, means for securing said bars to each other and to the tubular member, an internal resilient air tight tube, means for inflating said internal tube, and a cap member of rigid material mounted on each end of the structure and each provided with a shoulder portion overlapping the external bar and extending toward the center of the structure, said cap members being secured to the external bar and forming closures at the ends of the resilient tubular member first mentioned for the purpose of confining the internal resilient tube therein.

3. A pneumatic bumper for automobiles comprising a resilient tubular member, relatively rigid internal and external bars sector shaped in cross section extending lengthwise with respect to said tubular member and between which said tubular member is secured, bolts for securing said bars to each other and to the tubular member, said bolts having their heads secured to said internal bar and extending through the tubular member and the external bar, an internal resilient air tight tube, means for inflating said internal tube, and a closure member at each end of the resilient tubular member first mentioned.

4. A pneumatic bumper for automobiles comprising a resilient tubular member, relatively rigid internal and external bars sector shaped in cross section extending lengthwise with respect to said tubular member and between which said tubular member is secured, bolts for securing said bars to each other and to the tubular member, said bolts having their heads countersunk in and secured to said internal bar and extending through the tubular member and the external bar, an internal resilient air tight tube, means for inflating said internal tube, and a closure member at each end of the resilient tubular member first mentioned.

5. A pneumatic bumper for automobiles comprising a resilient tubular member, relatively rigid internal and external bars sector shaped in cross section extending lengthwise with respect to said tubular member and between which said tubular member is secured, bolts for securing said bars to each other and to the tubular member, said bolts having their heads countersunk in and secured to said internal bar and extending through the tubular member and the external bar, an internal resilient air tight tube, an air valve attached to said internal tube adjacent one end thereof and extending through apertures in the first mentioned resilient tubular member and the bars to which the same is attached, and a closure member at each end of the resilient tubular member first mentioned.

6. A pneumatic bumper for automobiles comprising a resilient tubular member, relatively rigid internal and external bars sector shaped in cross section extending lengthwise with respect to said tubular member and between which said tubular member is secured, bolts for securing said bars to each other and to the tubular member, said bolts having their heads countersunk in and secured to said internal bar and extending through the tubular member and the external bar, an internal resilient air tight tube, an air valve attached to said internal tube adjacent one end thereof and extending through apertures in the first mentioned resilient tubular member and the sector bars to which the same is attached, and a cap member mounted on each end of the structure, said cap members being secured to the external bar and forming closures for the ends of the resilient tubular member first mentioned.

7. A pneumatic bumper for automobiles comprising a resilient tubular member, relatively rigid internal and external bars sector shaped in cross section extending lengthwise with respect to said tubular member and between which said tubular member is secured, bolts for securing said bars to each other and to the tubular member, said bolts having their heads countersunk in and secured to said internal bar and extending through the tubular member and the external bar, an internal resilient air tight tube, an air valve attached to said internal tube adjacent one end thereof and extending through apertures in the first mentioned resilient tubular member and the sector bars to which the same is attached, and a cap member mounted on each end of the structure and each provided with a shoulder portion overlapping the external bar and extending toward the center of the structure, said cap members being secured to the external bar and forming closures for the ends of the resilient tubular member first mentioned.

In testimony whereof, I have hereunto signed my name.

HENRY SCHMIDT.